United States Patent [19]

Shiota

[11] Patent Number: 4,780,815
[45] Date of Patent: Oct. 25, 1988

[54] MEMORY CONTROL METHOD AND APPARATUS

[75] Inventor: Kenji Shiota, Nagoya, Japan

[73] Assignee: Hitachi, Ltd., Tokyo, Japan

[21] Appl. No.: 16,519

[22] Filed: Feb. 17, 1987

Related U.S. Application Data

[63] Continuation of Ser. No. 540,156, Oct. 7, 1983, abandoned.

[30] Foreign Application Priority Data

Oct. 15, 1982 [JP] Japan .................................. 57-179843

[51] Int. Cl.⁴ .............................................. G06F 12/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,047,160 | 9/1977 | Wolf | 364/900 |
| 4,393,501 | 7/1983 | Kellogg et al. | 364/200 |
| 4,435,752 | 3/1984 | Winkleman | 364/200 |
| 4,520,453 | 5/1985 | Chow | 364/900 |

Primary Examiner—Gary V. Harkcom
Assistant Examiner—C. H. Lynt
Attorney, Agent, or Firm—Antonelli, Terry & Wands

[57] ABSTRACT

A memory control method and apparatus useful in an input/output buffer memory of a multistation system. The buffer memory storage locations are dynamically divided into a plurality of unit groups having varying storage capacities, and flags are provided which indicate whether or not units are in use. When buffer memory is requested, the size of the requested area is divided by the size of a unit to determine the number of units required and a bit pattern indicating this number is provided. The bit pattern is successively compared and shifted with respect to the flags until the required number of adjacent unused units is found.

8 Claims, 6 Drawing Sheets

MEMORY CONTROL METHOD AND APPARATUS

This application is a continuation, of application Ser. No. 510,156, filed Oct. 7, 1983, now abandoned.

BACKGROUND OF THE INVENTION

The present invention relates to a memory control method and apparatus. More particularly, it relates to a processing control method for selecting and freeing a memory area which serves to temporarily store input/output data in a multistation system that is constructed of a master station and a plurality of slave stations connected thereto, each of the slave stations having input/output devices.

In a system of this type, each station is furnished with a processing unit, such as microprocessor, which processes data applied from an input device or delivers processed data to an output device. In general, the data involved in the input or output operation is first stored in a memory called a "buffer memory" and then processed or delivered. Recently, a buffer area is provided at a part of a RAM (Random Access Memory) included in each station and is used for the operation, rather than providing a separate buffer memory.

In this case, the input or output operation necessitates a memory control for obtaining a buffer area of requisite size in the memory in compliance with a request from the input/output device or the processing unit or for freeing a buffer area of certain size. Selecting the buffer area is executed, for example, when data applied from the input device is stored in the buffer area in order to process the data by means of the processing unit. Herein, the memory is searched sequentially from its head address to determine whether or not a blank area exists, whereupon the buffer area as requested is selected. On the other hand, freeing the buffer area is executed in a case where, when a selected buffer area of certain size has become unnecessary for use by one input/output device, the area is freed so as to offer it to another device.

Such memory control, especially the control for selecting the buffer area takes a long time for the reasons that the blank area must be searched sequentially from the head address of the memory, and even when a blank area exists, whether or not an area of requisite size is blank must be successively checked.

In order to overcome such disadvantage, there has been proposed a control method wherein the memory is divided into fixed block sizes, and upon request for selecting a buffer area, a blank block is allotted to the request. In general, however, the size of the block is fixedly set in previous consideration of the largest capacity of a buffer size which might be requested. Accordingly, the block corresponding to the largest capacity is selected even for a request for a buffer area of small capacity. This results in lowering of the efficiency of use of the memory.

SUMMARY OF THE INVENTION

An object of the present invention is to provide a memory control method which can select an area of requisite size in a memory at comparatively high speed without lowering the efficiency of use of the memory.

Another object of the present invention is to provide a memory control method which can select a buffer area for an input/output device in a memory or free a selected area at comparatively high speed.

Still another object of the present invention is to provide a memory control method in which processing for selecting and freeing a buffer area in a memory can be executed by comparatively simple arithmetic processing, such as shift processing and comparison processing.

In accordance with the present invention, an input/output buffer area is set in a memory disposed in a master station, in order to cope with a request from an input/output device. The buffer area is divided into a plurality of unit groups of unequal sizes, and each unit serving as a minimum unit has a flag set which indicates whether or not the particular unit is in use.

When a certain input/output device has requested use of a buffer area, the size (capacity) of the requested buffer area is divided by the size of the smallest unit, to calculate the number of requisite units, and a digit pattern which is uniquely determined in accordance with this number of units is produced. This digit pattern is compared with information indicated by flags provided in correspondence with the units. When both agree, it is deemed that there are units not in use, and the requested area is selected as the set of units corresponding to the flags. In contrast, when the comparison results are in disagreement, the digit pattern is shifted by a component corresponding to a certain unit group so as to produce a new digit pattern, and the new digit pattern is compared with the flag information. When the agreement as stated above is reached by repeating such operations, the presence of a unit group not in use is detected, and the units are selected as the requested buffer area. When such comparisons do not result in agreement, all the units are in use, and the requisite buffer area is not available.

On the other hand, in case of freeing selected units, namely, a buffer area of certain size, a digit pattern is produced similarly to the above on the basis of the number of units to be released. The digit pattern is shifted from an address indicative of the area to-be-freed, whereby a flag corresponding to the pattern is rewritten as being unused. Thus, a certain unit is released so as to be ready for future use.

According to the present invention, the size of a requested buffer area is divided by the minimum unit size so as to be converted into the number of units, and the smallest unit group including the resulting unit is allotted, so that the efficiency of use of a buffer area is not lowered significantly. Moreover, since the processing for selecting and freeing a buffer area can be readily executed by such simple processing as shift processing and comparison processing, the buffer processing including a large number of repeated operations can be executed at high speed.

DESCRIPTION OF THE PREFERRED EMBODIMENT

Figure 1:
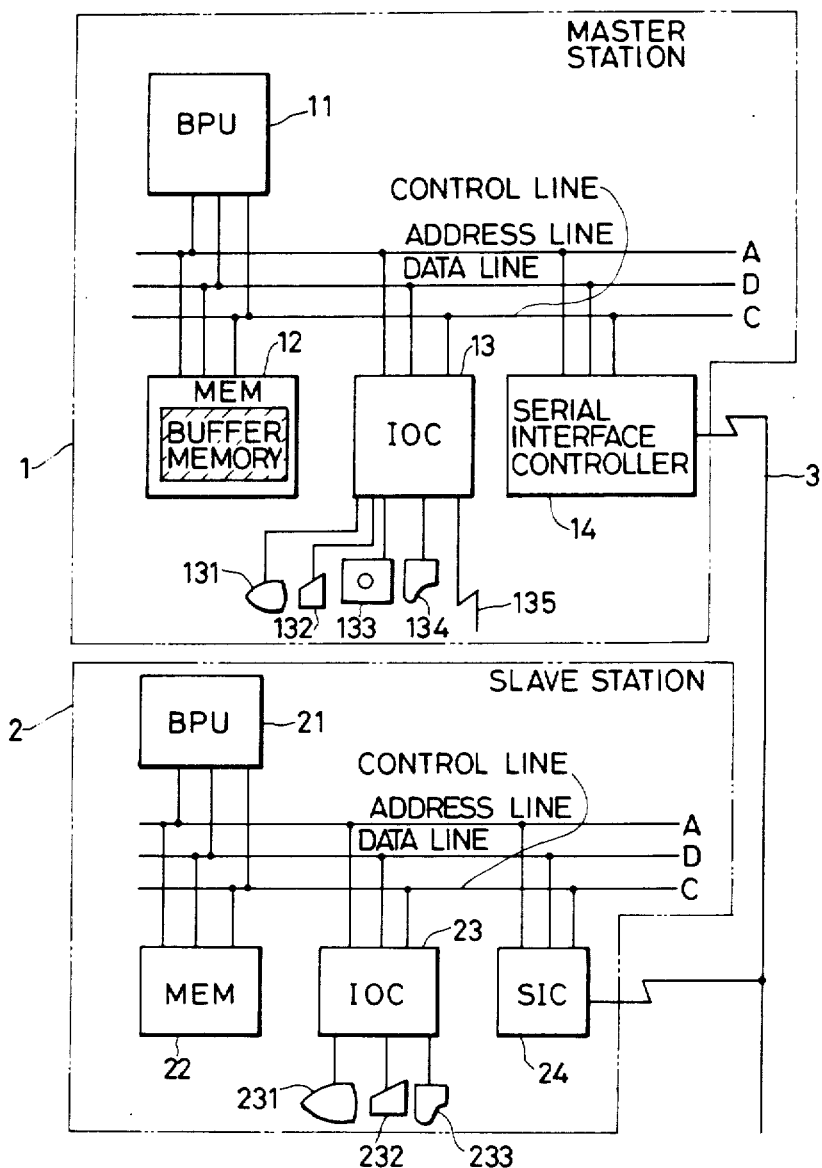
FIG. 1 is a block diagram showing the outline of a multistation system.

FIG. 1 shows the outline of a multistation system to which an embodiment of the present invention is applied.

The multistation system is constructed of a master station 1, and a plurality of slave stations 2 which are connected thereto through a serial interface 3.

In the master station 1, there are provided an address line A for transmitting an address, a data line D for transmitting data, and a control line C for transmitting various control signals. A Boolean processing unit 11, a memory 12, an input/output controller 13 and a serial interface controller 14 are connected to these lines. Here, the Boolean processing unit 11 is constructed as a microprocessor, and it performs various data processing operations in the master station 1. The memory 12 serves to store data, programs, control data etc. As will be described in detail later, the method of control of the memory is significant in the embodiment. Input/output devices, such as a display 131, a keyboard 132, a magnetic storage 133, a printer 134 and a communication circuit 135, are connected to the I/O controller 13, and the controller 13 executes the input/output controls of these I/O devices. The serial interface controller 14 controls the sending and reception of data to and from the slave stations 2 through the serial interface 3.

The slave station 2 is substantially similar in construction to the master station 1 described above. That is, a Boolean processing unit 21, a memory 22, an input/output controller 23 for controlling a plurality of input/output devices 231, 232 and 233, and a serial interface controller 24 are connected to an address line A, a data line D and a control line C. In this case, processing requests are issued from the I/O devices 231, 232 and 233 of the slave station 2 to the master station 1.

Figure 2:
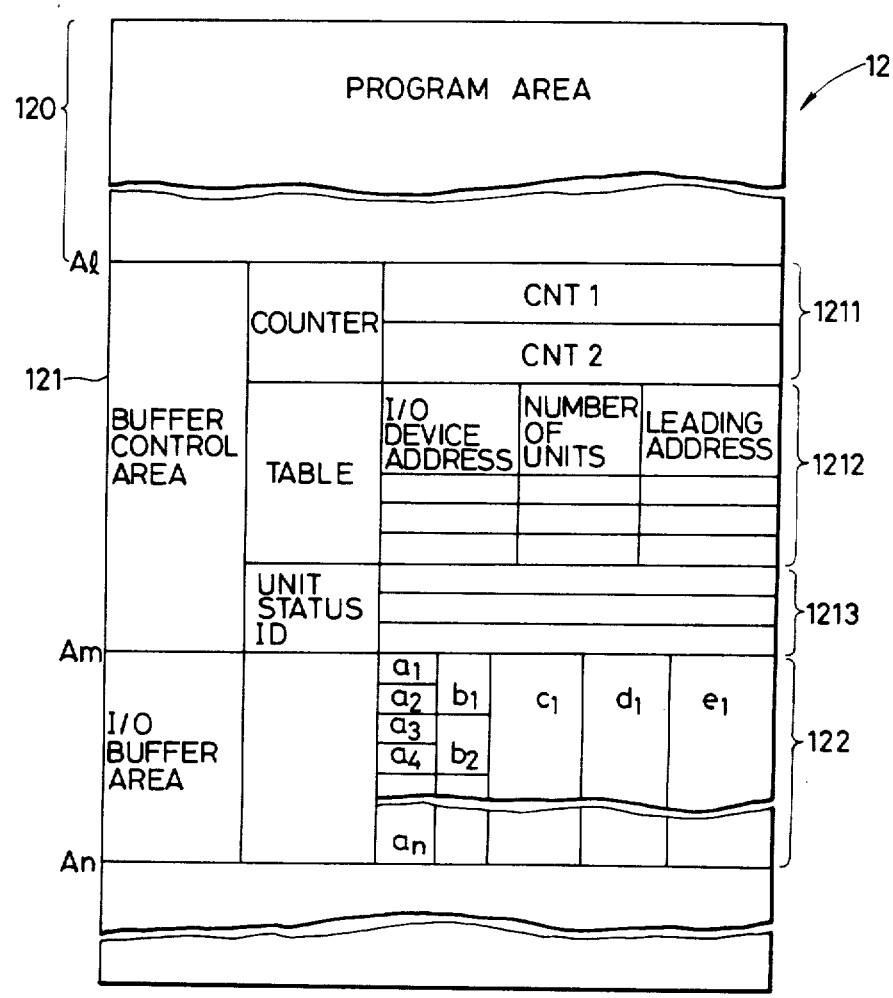
FIG. 2 is a diagram showing the schematic storage allocation of a memory in a master station.

Referring now to FIG. 2, the storage organization of the memory 12 of the master station 1 will be outlined.

This memory 12 is composed of a program area 120, a buffer control area 121, an I/O buffer area 122, and the other areas. Here, the program area 120 from the head address to an address $A_{l-1}$ stores therein programs for controlling the various units and various input/output devices 131–135 in the master station 1. The buffer control area 121 from an address $A_l$ to $A_{m-1}$, and the I/O buffer area 122 from an address $A_m$ to $A_{n-1}$ are significant to the present invention.

The buffer control area 121 stores therein control information indispensable to processing for selecting or freeing the I/O buffer area 122. More specifically, this area 121 is composed of a counter area 1211, a management table 1212 and a unit status identification area 1213 to be described later. The counter area 1211 stores therein programable counter values which are used in the selecting and freeing processing for the buffer area as will be described later. The management table 1212 consists of areas for storing an I/O device address, the number of requisite units and the head address of the selected buffer area. The I/O devices 131–135 and 231–233 included in the master station 1 and slave station 2 are assigned device addresses which are different from one another. When any of these I/O devices requests the I/O buffer area 122 to select a buffer area of certain size, the I/O device address thereof is registered in the I/O device address area of the table 1212. As will be stated later, the size of the requested buffer area is converted into the number of units, and the number of units required for the particular I/O device is registered in the table 1212. In addition, the head address of the buffer area selected for this I/O device is registered.

The unit status ID area 1213 stores therein flags to be described later, which indicate in correspondence with the units of the buffer area 122 whether or not the units have been selected, in other words, whether or not they are in use.

Figure 3:
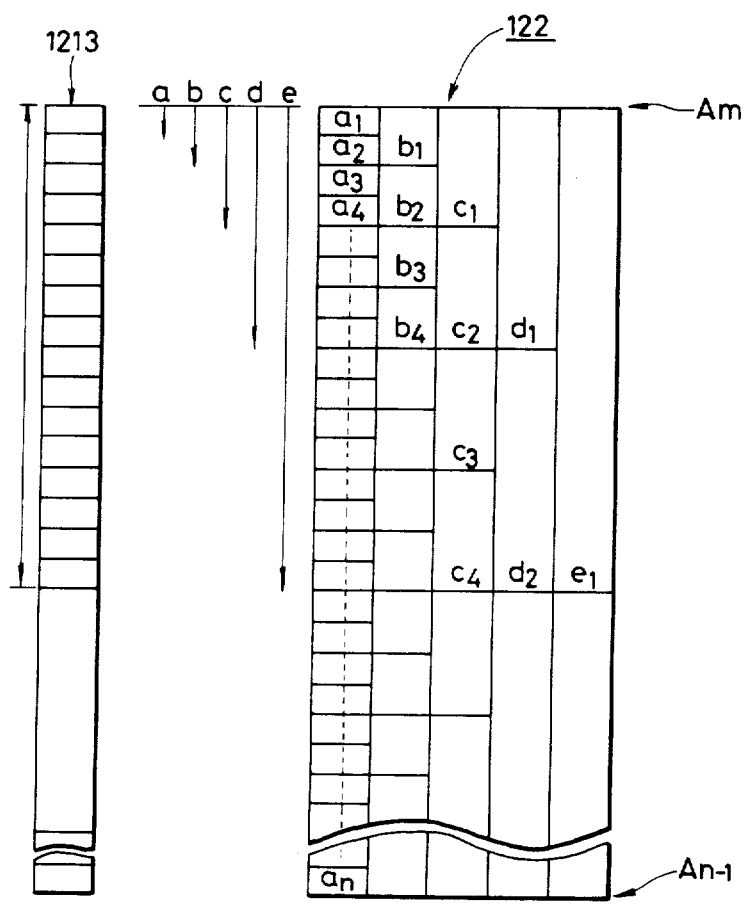
FIG. 3 is a diagram showing the schematic organization of an I/O buffer area.

Now, the buffer area 122 will be described with reference to FIG. 3 showing it more in detail. The buffer area 122 becomes the subject of a buffer area request from the I/O device, and it is set beforehand at a capacity which can comply with the requests from the plurality of I/O devices. This buffer area 122 is divided into a plurality of units. Moreover, the sizes of the division are respectively different. In case of the present embodiment, the units consist of five types of groups $a_i$, $b_j$, $c_k$, $d_l$ and $e_m$, and the bit widths of the respective units are unequal. The smallest unit is the unit $a_i$, the bit width of which is 512 bytes. The unit status ID 1213 indicating the status of use of the units is set in correspondence with the smallest units $a_i$. Further, the unit $b_j$ is 2 times larger than the unit $a_i$ or has a bit width of 1024 bytes, the unit $c_k$ is 4 times larger or has 2048 bytes, the unit $d_l$ is 8 times larger or has 4096 bytes, and the unit $e_m$ is 16 times larger or has 8192 bytes. The numbers of the individual units in the respective groups a–e are set at, for example, $1 \leq a_i \leq 48$, $1 \leq b_j \leq 24$, $1 \leq c_k \leq 12$, $1 \leq d_l \leq 6$ and $1 \leq e_m \leq 3$. Here, i is any natural number selected from 1–48, j from 1–24, k from 1–12, l from 1–6, and m from 1–3.

The significance of such division of the buffer area 122 into the several unit groups of unequal sizes consists in improving the efficiency of use of the buffer area 122 by allotting the unit group of the minimum capacity which contains the requested buffer size.

Figure 4:
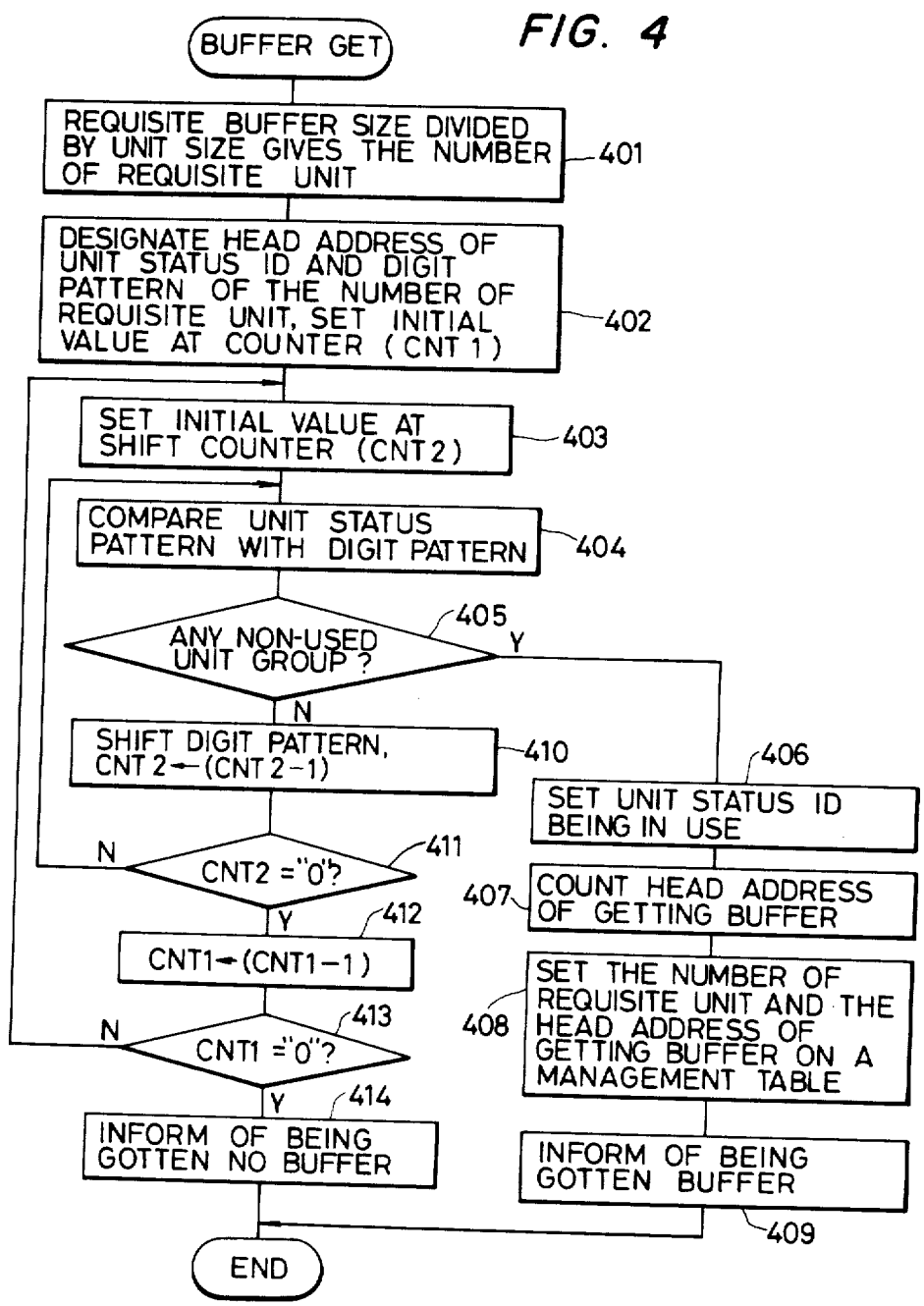
FIG. 4 is a processing flow diagram for selecting a buffer area.

Now, processing operations for selecting a buffer area will be described with reference to a processing flow shown in FIG. 4.

Various data processing requests are issued from the input/output devices of the master station 1 or the slave station 2 to the Boolean processing unit 11 of the master station 1. An input processing request from the I/O device in the master station 1, for example, the keyboard 132 is given to the Boolean processing unit 11 through the I/O controller 13 as well as the control line C. Likewise, a processing request from the I/O device in the slave station 2 is given to the Boolean processing unit 11 through the serial interface 3, the serial interface controller 14 and the control line C.

In such cases, data transmission is generally effected. Along with the aforementioned request, a request for selecting a buffer area is sent through the control line C. Further, the address of the input/output device having issued the request and the size of the buffer area to be selected are similarly sent through the data line D.

In the present embodiment, the size of the requisite buffer area is determined in such a way that the size is converted into the number of units in correspondence with a certain unit group shown in FIG. 3 and one or more units of the group are selected on the buffer area 122.

First, the size of the requisite buffer area is sent to the Boolean processing unit 11 and is divided by the minimum unit size or 512 bytes, to calculate the number of requisite units (Step 401). In this case, when a remainder arises, "1" is added to the obtained quotient, and the sum becomes the number of requisite units. Assuming by way of example that the requisite buffer size is 2000 bytes, the number of requisite units becomes 4 (four). Herein, a unit group $c_k$ shown in FIG. 3 is thereafter made significant. As another example, when the requisite buffer size is 3000 bytes, the number of requisite units becomes 6 (six) by similar operations. Herein, a unit group $d_l$ whose unit has the capacity of eight minimum units is thereafter made significant. Anyway, the unit group of the smallest size including the requisite unit or units is selected. By way of example, when the number of requisite units is 4 and a unit group $c_k$ is to be retrieved as described above, the bit pattern of the unit status ID and a digit pattern produced in correspondence with the number of requisite units, namely, "1111000000000000" are subsequently set from the head address $A_m$ of the unit status ID. Also, an initial value is set in a repetition counter CNT1. In the comparison of the digit pattern with a unit status ID pattern to be described later, the "number of repetition" serves to avoid the simultaneous comparison with the whole unit status ID pattern and to perform several divided comparisons. In the present example, the digit pattern is 16 bits, and the unit status ID pattern becomes 48 bits because the largest number of units is assumed 48 (forty-eight) of the unit group $a_i$. Accordingly, both the patterns need to be compared three times every 16 bits. Therefore, "3" is first set in the counter CNT1 as the initial value (Step 402).

Next, the number of requisite units, namely, "4" in the present example is set in a shift counter CNT2 as an initial value (Step 403).

Subsequently, the unit status ID pattern and the digit pattern are compared (Step 404). Thereafter, whether or not there is any unused unit group in the buffer area is decided (Step 405). If there is any unused unit group, the processing flow proceeds to Step 406, and if there is not, the processing of Step 410 is executed.

Figure 6:
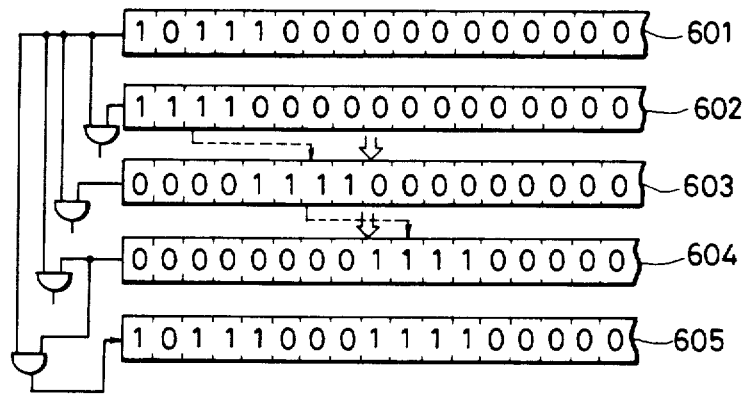
FIG. 6 is a diagram showing the transition of the comparison processing of a unit flag and a digit pattern in processing for selecting a buffer area.

This operation will be equivalently described with reference to a status transition diagram shown in FIG. 6. In the comparison between a unit status ID pattern 601 and a digit pattern 602 corresponding to the number of requisite units as illustrated in FIG. 6, the logical AND condition of both the patterns is taken. If the result is "0", the presence of an unused buffer area or the unit group $c_k$ is decided, and if it is "1", it is decided that the buffer area is in use.

In the case of the example of FIG. 6, the results of the AND of both the patterns at all the bits do not become "0", and hence, it is decided that the unit group corresponding to the particular unit status ID pattern is in use, whereupon the processing proceeds to Step 410. The digit pattern is shifted rightwards by 4 bits, and the content of the counter CNT2 of the counter area 1211 is subjected to minus "1" (Step 410). Subsequently, whether or not the content of the counter CNT2 is "0" is decided (Step 411). In the present example, the content of the counter CNT2 becomes "3" because it was "4" at the beginning and was subjected to minus "1" at Step 410. As a result, the processing returns to Step 404. The subsequent processing from Step 404 is similar to the foregoing.

This processing operation will be described by referring to FIG. 6 again. The logical AND condition is taken between the unit status ID pattern 601 and a new digit pattern 603 obtained by shifting the digit pattern 602 rightwards by 4 bits. Whether or not the result is "0" is decided. In the present example, the results of the AND at all the bits do not become "0" yet at the first shift. The results of the AND between the unit status ID pattern 601 and a new digit pattern 604 obtained by further shifting the digit pattern 603 rightwards by 4 bits become "0" at all the bits.

At this stage, Step 405 decides that there is an unused unit group $c_k$, whereupon the processing proceeds to Step 406. Then, a unit group $c_k$ in a position corresponding to the digit pattern 604 is selected. That is, the logical OR between the unit status ID pattern 601 and the digit pattern 604 in FIG. 6 is taken, and the result is written into the unit status ID area 1213 as a new unit status ID pattern 605.

Subsequently, the head position of the unit status ID and the number of bytes of the unit group $c_k$, namely, 2048 are multiplied to calculate the head address of the selected buffer area (Step 407). On the management table 1212, the number of requisite units and the head address of the selected buffer area are stored in correspondence with the address of the I/O device having requested the buffer area (Step 408). Thereafter, the I/O device having issued the request is informed of selection of the buffer area (Step 409). Then, the buffer area selection processing ends.

On the other hand, in the case where the absence of any unused unit group has been determined at Step 405 and where the value of the counter CNT2 has been successively decremented to the value "0" (Step 411), the value of the repetition counter CNT1 is subjected to minus "1" (Step 412), whereupon whether or not the value of the counter CNT1 is "0" is decided (Step 413). If the result is "0", the processing proceeds to Step 414, and if not, it returns to Step 403. In case of the present embodiment, the maximum number of units is 48 of the unit group $a_i$, and the unit status ID pattern is composed of 16 bits corresponding to one word. Therefore, the comparing operations need to be performed three times in order to compare the digit pattern with the whole unit status ID pattern. In the present example, the value of the counter CNT1 is set at "3" at first, and it is still "2" even when "1" is subtracted therefrom at Step 412. Therefore, the processing returns to Step 403. The shift counter CNT2 is initialized again, that is, "4" is set therein, whereupon the processing of Step 404 is executed. The processing from Step 404 on is similar to the foregoing operations. The value of the repetition counter CNT1 is updated again at Step 412, and becomes "1" this time. Since this value is not "0" at the decision of Step 413, the processing returns to Step 403 again, and the operations similar to the foregoing are executed.

When it is finally decided at Step 413 that the value of the counter CNT1 is "0", the absence of an unused buffer area as requested, namely, the unit group $c_k$ in the present example, is judged in spite of having checked the whole unit status ID pattern, and the I/O device having issued the request is informed that no buffer area has been selected (Step 414). Then, the buffer area selection processing ends.

Figure 5:
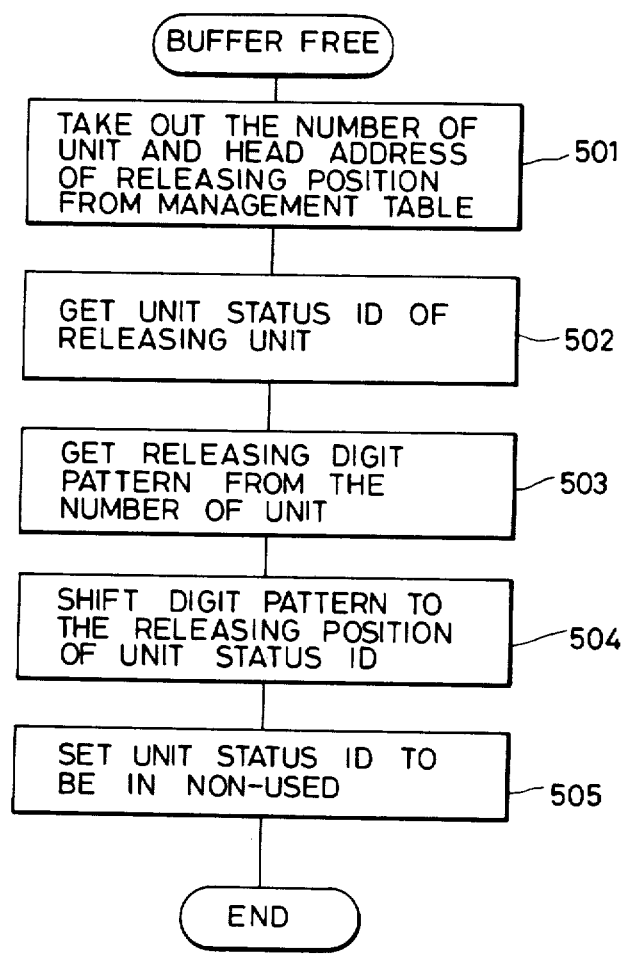
FIG. 5 is a processing flow diagram for freeing a buffer area.

In the next place, operations for freeing a buffer area will be described with reference to a processing flow shown in FIG. 5.

In a case where data stored in a unit group of a certain unit already selected in the buffer area 122 has been delivered to a certain output device or where the unit group has become no longer necessary for the device, freeing the buffer area is performed on the basis of a buffer free request issued from a processed input/output device, in order to place the area at the service of another device.

When a buffer free request has been issued from a certain input/output device, this request and the address of the input/output device are sent to the Boolean processing unit 11 through the control line C.

In the Boolean processing unit 11, when the buffer free request is sensed, the number of units registered in correspondence with the address of the input/output device and the head address, e.g., $A_k$ of the units are taken out from the management table 1212 shown in FIG. 2 (Step 501).

Subsequently, the head address $A_m$ of the buffer area 122 is subtracted from the head address $A_k$ of the buffer area to-be-freed, to calculate the displacement value of the addresses. The address displacement value is divided by the minimum unit size or 512 bytes, whereby the position of the unit status ID of the unit to be released is calculated (Step 502).

A digit pattern to be released is prepared from the number of requisite units in the table 1212 (Step 503).

This digit pattern is shifted to the releasing position of the unit status ID (Step 504).

Figure 7:
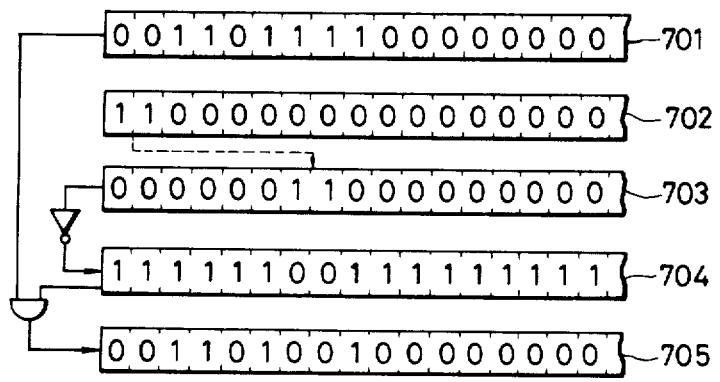
FIG. 7 is a diagram showing the transition of processing for freeing a buffer area.

The situation will be equivalently described with reference to a status transition diagram shown in FIG. 7. By way of example, the unit status ID is assumed to be pattern 701 here. Further, the number of units to be released is assumed to be 2 (two) of the unit group $b_j$. Then, the releasing digit pattern becomes "1100000000000000" as indicated at numeral 702. When the releasing position of the unit status ID is evaluated to be, for example, "6" at the foregoing step 502, the releasing digit pattern is shifted rightwards 6 times as indicated at numeral 703. "1" and "0" in this releasing digit pattern are inverted as indicated at numeral 704.

Referring back to FIG. 5, at Step 505, the unit status ID is rewritten from "1" indicative of "in use" into "0" indicative of "not in use" in correspondence with the unit to be released. Referring to FIG. 7 in this connection, the logical AND condition between the unit status ID pattern 701 and the releasing digit pattern 704 is taken, and the resulting new pattern becomes a unit status ID 705 after the rewriting. In this way, the certain area in the buffer area 122 is freed.

As thus far described, in the present embodiment, a buffer area is divided into a plurality of sorts of unit groups having unequal sizes, and each smallest unit is furnished with a unit status identification flag which indicates whether or not the unit is in use. In compliance with a buffer selection request from an input/output device, the size of a requisite buffer area is converted into the number of units, and the smallest unit group including the converted unit is allotted. It is therefore possible to avoid lowering the efficiency of use of the buffer area drastically. Moreover, processing for selecting and freeing the buffer area can be readily performed by the basic processing of a Boolean processing unit, such as the shift and comparison of bit patterns, so that the buffer processing including a large number of repeated operations can be executed efficiently and fast.

What we claim is:

1. A memory control method of selecting an area in a memory having a requested capacity, comprising:
    (a) dividing the memory into a plurality of unit storage areas each having a unit storage capacity;
    (b) setting a flag for each of the unit storage areas of the divided memory, said flags indicating whether or not the corresponding unit storage area is in use;
    (c) calculating the smallest number of unit storage areas having the requested storage capacity, in response to a request for selecting an area of certain capacity in the memory;
    (d) comparing a first pattern of digital signals uniquely obtained from the calculated smallest number and a second pattern of digital signals indicated by said flags while successively shifting the first pattern with respect to the second pattern by a predetermined unit amount, and
    (e) finding a group, consisting of contiguous unit storage areas, which is not in use, for satisfying the requested capacity in accordance with the comparison.

2. A memory control method according to claim 1, further comprising:
    (f) taking a logical OR between the first pattern and the second pattern when the group of said contiguous unit storage areas which is not in use has been found, and rewriting the flags on the basis of the logical OR result.

3. A memory control method according to claim 1, wherein (d) the second pattern is constructed as a set of a plurality of divided third patterns, the first pattern is compared with the third pattern while the first pattern is being shifted by said predetermined unit amount, and when agreement is not found by the comparison with the certain third pattern, comparisons are successively made with the other third patterns.

4. A memory control method according to claim 1, further comprising:
    (f) registering information identifying the selected group and a head memory address thereof in a registration table for every device that requests a storage area in the memory.

5. A memory control method according to claim 4, further comprising:
    (g) preparing a fourth pattern uniquely determined from the information of the registration table indicating a particular group, when a request has been made for freeing an area of the certain group in the memory;
    (h) shifting the fourth pattern a certain amount from the position indicated by the head address in the registration table, and inverting the shifted pattern to prepare a fifth pattern; and
    (i) taking a logical AND between the fifth pattern and the second pattern, and updating the flags in accordance with the logical AND result.

6. A memory control apparatus for selecting an area of at least a requested capacity in a memory, comprising:
    (a) a memory which is divided into a plurality of unit storage areas each having an equal unit storage capacity;
    (b) storage means for storing flag information indicating whether or not each of the unit storage areas is in use;
    (c) a Boolean processing unit connected to said storage means and including means for calculating the smallest number of unit storage areas which will provide a requisite storage capacity in response to a request for selecting an area of a certain capacity in the memory and means for comparing a first digit pattern uniquely obtained from the calculated smallest number and a second digit pattern corresponding to the flag information while successively shifting the first digit pattern with respect to the second digit pattern by a predetermined contiguous unit amount, so as to select a group of unit storage areas having the requisite storage capacity and which is not in use in accordance with the comparison.

7. A memory control apparatus according to claim 6, further comprising:
(d) means for storing a table in which information identifying the selected group of contiguous unit storage areas and a head address thereof in the memory are registered for every device that requests a storage area in the memory.

8. A multistation system constructed of a master station and at least one slave station connected thereto, each of the stations having a plurality of input/output devices, comprising:

(a) a memory which is disposed in said master station and which can be accessed from the input/output devices in said master and slave stations, said memory being divided into a plurality of unit storage areas each having an equal unit storage capacity;
(b) storage means for storing flag information indicating whether or not each of said unit storage areas in said memory is in use;
(c) a Boolean processing unit including means for calculating the smallest number of unit storage areas which will provide a requisite capacity, in response to a request for memory access from an input/output device and means for comparing a digit pattern obtained from the calculated smallest number and the flag information while shifting the digit pattern with respect to the flag information by a predetermined unit amount, so as to select a group of contiguous unit storage areas which are not in use in accordance with the comparison; and
(d) means for storing as a table information identifying the selected group and a head address thereof referring to the input/output device that has requested the group in said memory.

* * * * *